(12) United States Patent
Carasco et al.

(10) Patent No.: US 9,915,738 B2
(45) Date of Patent: Mar. 13, 2018

(54) DEVICE FOR MEASURING THE AMOUNT OF BERYLLIUM IN A RADIOACTIVE OBJECT

(71) Applicant: COMMISSARIAT A L'ENERGIE ATOMIQUE ET AUX ENERGIES ALTERNATIVES, Paris (FR)

(72) Inventors: Cedric Carasco, Vinon-sur-Verdon (FR); Bertrand Perot, Venelles (FR); Alain Mariani, Vinon-sur-Verdon (FR); Sebastien Colas, Couternon (FR); Nicolas Saurel, Varois et chaignot (FR)

(73) Assignee: COMMISSARIAT A L'ENEGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/113,370

(22) PCT Filed: Jan. 26, 2015

(86) PCT No.: PCT/EP2015/051484
§ 371 (c)(1),
(2) Date: Jul. 21, 2016

(87) PCT Pub. No.: WO2015/110631
PCT Pub. Date: Jul. 30, 2015

(65) Prior Publication Data
US 2017/0003400 A1 Jan. 5, 2017

(30) Foreign Application Priority Data
Jan. 24, 2014 (FR) .................................... 14 50628

(51) Int. Cl.
*G01T 3/00* (2006.01)
*G01T 1/167* (2006.01)

(52) U.S. Cl.
CPC ............... *G01T 1/167* (2013.01); *G01T 3/00* (2013.01)

(58) Field of Classification Search
CPC ............................. G01T 1/167; G01T 3/008
See application file for complete search history.

(56) References Cited

U.S. PATENT DOCUMENTS

| 4,095,106 A * | 6/1978 | Wallace ................. G01N 23/06 250/358.1 |
| 2005/0135536 A1 | 6/2005 | Lyoussi et al. |

(Continued)

OTHER PUBLICATIONS

International Search Repored dated Apr. 1, 2015, in PCT/EP2015/051484 Filed Jan. 26, 2015.

(Continued)

*Primary Examiner* — Kiho Kim
(74) *Attorney, Agent, or Firm* — Oblon, McClelland, Maier & Neustadt, L.L.P.

(57) ABSTRACT

A device for measuring an amount of beryllium in a radioactive object, including: a hollow cylinder of a first piece made of a material to thermalize neutrons emitted by the radioactive object and a metal piece to mitigate a dose rate on the radioactive object, the first piece having a hollow cylinder shape deprived of a wall fraction, the metal piece including a solid part inserted in a space which corresponds to the deprived wall fraction of the first piece and a recessed part which is an extension of the solid part and is accommodated within the wall of the first piece, in contact with the first piece; a gamma radiation source accommodated in an indentation of the recessed part of the metal piece; and at least one neutron detector placed in a bulk of the first piece.

11 Claims, 3 Drawing Sheets

(56) References Cited

U.S. PATENT DOCUMENTS

2005/0280816 A1* 12/2005 Agrawal .............. G01N 21/643
356/317
2006/0104400 A1 5/2006 Lyoussi et al.
2013/0279639 A1 10/2013 Perot et al.

OTHER PUBLICATIONS

French Search Report dated Sep. 26, 2014, in FR 1450628 Filed Jan. 24, 2014.
Ali, et al., "A feasibility study for the in vivo measurement of beryllium by photonuclear activation." Physics in Medicine and Biology, vol. 30, No. 12, 1985, XP020022881 , pp. 1277-1287.
Moussavi-Zarandi, "Determination of beryllium by use of photonuclear activation techniques," Applied Radiation and Isotopes, vol. 66, No. 2, 2007, XP022392287, pp. 158-161.

* cited by examiner

DEVICE FOR MEASURING THE AMOUNT OF BERYLLIUM IN A RADIOACTIVE OBJECT

TECHNICAL FIELD AND PRIOR ART

The invention relates to a device for measuring the amount of beryllium present in a radioactive object and, more particularly, in plutoniferous waste contained as a powder in containers.

Beryllium is a metal the traceability of which is necessary in objects likely to contain it and, more particularly, in radioactive objects.

To date, different techniques are known for measuring the amount of beryllium present in an object.

Among these techniques, some implement radiochemical analysis methods. Among these techniques, there is the inductively coupled plasma mass spectrometry analysis. The analysis is then performed exclusively on gas samples. For liquid, it is thus necessary to perform an evaporation of a liquid sample. For a solid, it is necessary to first dissolve a solid sample to form a liquid sample, for example using nitric acid, and then to perform an evaporation of the liquid sample. It is also possible, in the case of a solid, to occasionally evaporate the solid at the surface by applying a laser beam. In any case, once a gas sample is obtained, this sample is transformed into plasma by means of electrical discharges. Ions are extracted from the plasma and their mass is determined by mass spectrometry.

Other known techniques implement radiochemical analysis methods as, for example, fluorometry (beryllium thus forms a complex with a ligand which has fluorescence properties), laser induced atomic emission spectrometry (visible or ultraviolet radiation emission under the action of an excitation), infrared spectrometry (beryllium is extracted as a chemical form the infrared emission of which is measured by an infrared spectrometer), etc.

All these techniques are intrusive and require samplings on the investigated object. This work on samples raises the problem of the representativeness of the samples. Indeed, in the case where the object to be investigated is not homogeneous (waste container, surface contamination of an object having a complex shape and with surfaces difficult to access), the measurement results on samples are not representative of the actual amount of beryllium contained in the object. This is a drawback.

Besides, techniques which implement radiochemical analysis methods often deliver measurement results very late with respect to the time when the measurements are performed. This delay in obtaining measurement results is also a drawback.

Other known techniques are based on the following nuclear reaction:

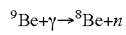

Gamma photons γ are bombarded on beryllium ($^9$Be). A gamma photon having a sufficient energy which interacts with a beryllium nucleus produces a photoneutron n. The photoneutrons produced are then counted and the amount of beryllium is deduced from the counting information. Document «*Determination of beryllium by use of photonuclear activation techniques*» (A. Moussavi-Zarandi/Applied Radiation and Isotopes 66 (2008) page 158-161) discloses such a technique. A sample of beryllium containing material is irradiated by photons from a $^{124}$Sb source. The photoneutrons which result from this irradiation are counted and the neutron counting results in determining the amount of beryllium present in the sample.

One drawback of this technique is the fact that it is intrusive and it has to work on small size samples. The information on the amount of beryllium present in the investigated object is thus not representative in the case where the beryllium is not homogeneously distributed in a large dimension object, for example an object having a volume higher than one liter. Besides, in the case where the object is radioactive, there is a strong neutron noise due to the object radioactivity which disturbs the measurement, such that the noise due to neutron emission of plutonium (Pu).

The device of the invention does not have the abovementioned drawbacks.

DISCLOSURE OF THE INVENTION

Indeed, the invention relates to a device for measuring the amount of beryllium in a radioactive object, the device comprising:

a hollow cylinder consisting of a piece made of a material able to thermalize neutrons emitted by the radioactive object and a metal piece able to mitigate a dose rate on the radioactive object, the piece of material able to thermalize neutrons having a hollow cylinder shape deprived of a wall fraction, the metal piece comprising a solid part inserted in a space which corresponds to the deprived wall fraction of the piece made of a material able to thermalize neutrons and a recessed part which extends away from the solid part and is accommodated within the wall of the piece made of a material able to thermalize neutrons, in contact with the piece made of a material able to thermalize neutrons, a gamma radiation source accommodated in an indentation of the recessed part of the metal piece, and at least one neutron detector placed in the bulk of the piece made of a material able to thermalize neutrons.

According to a further characteristic of the invention, the neutron detector is a helium 3 gas meter.

According to another further characteristic of the invention, the gamma radiation source is a point source.

According to yet another further characteristic of the invention, in the case where the radiation source is a point source, the device further comprises means able to move the source along an axis substantially parallel to the axis of the hollow cylinder.

According to yet another further characteristic of the invention, the gamma radiation source is a linear source attached in the indentation of the recessed part of the metal piece and having an axis substantially parallel to the axis of the hollow cylinder.

According to yet another further characteristic of the invention, the device comprises means able to rotate the radioactive object.

According to yet another further characteristic of the invention, the gamma radiation source is a $^{124}$Sb source.

According to yet another further characteristic of the invention, the hollow cylinder is a hollow revolution cylinder.

According to yet another further characteristic of the invention, in the case where the hollow cylinder is a hollow cylinder of revolution, a plurality of neutron detectors are evenly distributed in the piece of material able to thermalize neutrons, at an equal distance from a centre of a circle defined by the circular cross-section of the hollow revolution cylinder.

According to yet another further characteristic of the invention, the material able to thermalize neutrons is polyethylene.

According to yet another further characteristic of the invention, the metal piece is a lead piece.

According to yet another further characteristic of the invention, in a cross-section plane perpendicular to the axis of the cylinder, a distance which separates, in the piece made of a material able to thermalize neutrons, the metal piece from a neutron detector is lower than or equal to 5 cm and a distance which separates, in the piece made of a material able to thermalize neutrons, a neutron detector from an external surface which delimits the piece made of a material able to thermalize neutrons is higher than or equal to 2 cm.

According to yet another further characteristic of the invention, the distance which separates the metal piece from a neutron detector is lower than or equal to 3 cm and the distance which separates a neutron detector from an external surface which delimits the piece made of a material able to thermalize neutrons is substantially between 2 cm and 4 cm.

The device according to the invention is designed to minimize the disturbance brought about by the neutron noise due to the object radioactivity.

Advantageously, the device of the invention is also able to determine and quantize the amount of beryllium present in a bulky object in which the beryllium is not evenly distributed.

BRIEF DESCRIPTION OF THE FIGURES

Further characteristics and advantages of the invention will appear upon reading the description that follows, made in reference to the appended figures, in which.

DETAILED DISCLOSURE OF PARTICULAR EMBODIMENTS OF THE INVENTION

Figure 1A:
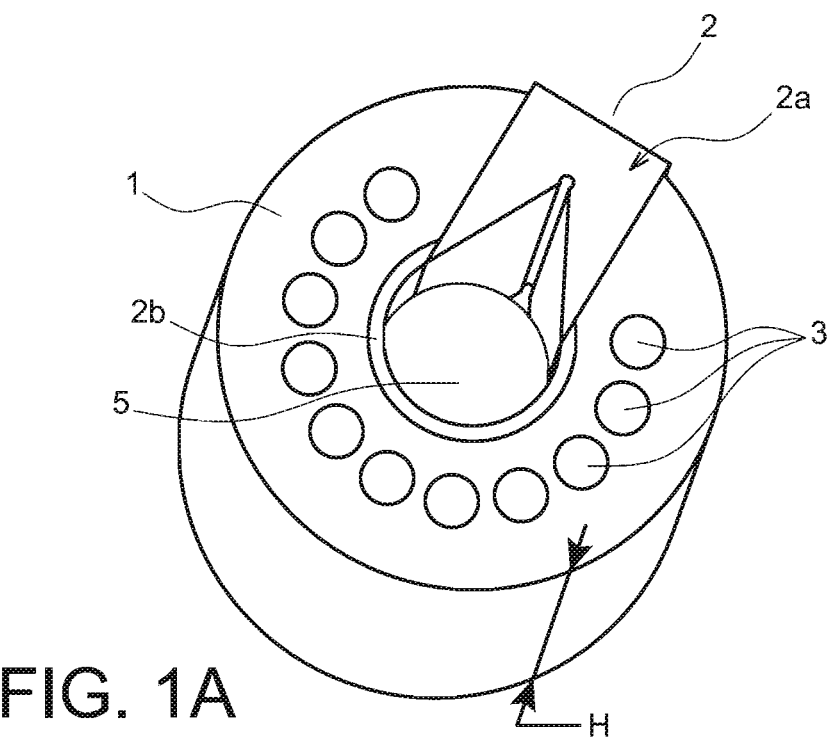
FIGS. 1A and 1B represent a perspective view and a top view of a device for measuring the amount of beryllium in a radioactive object according to the invention.
Figure 1B:
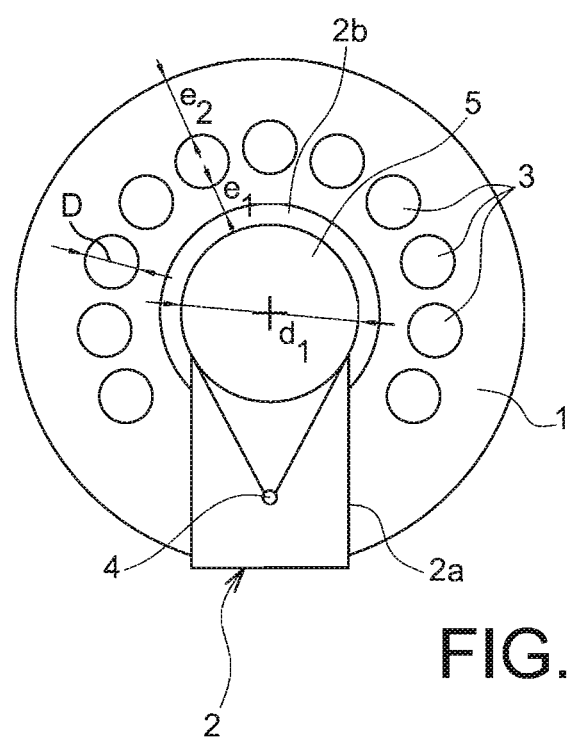

FIGS. 1A and 1B represent a perspective view and a top view of a device for measuring an amount of beryllium in a radioactive object, according to the preferential embodiment of the invention.

The device of the invention comprises:
a hollow cylindrical block formed by a piece 1 of material able to thermalize neutrons emitted by the radioactive object and a metal piece 2 able to mitigate the dose rate on the radioactive object and which is accommodated in the piece of material able to thermalize the neutrons, the radioactive object 5 being itself placed in the hollow of the hollow cylindrical block,
a gamma radiation source 4 placed in an indentation of the hollow part of the metal piece 2 and which emits a gamma radiation towards the object to be investigated, and
at least one neutron detector 3 placed in the body of the piece 1 made of a material able to thermalize neutrons.

According to the preferential embodiment of the invention, the material able to thermalize the neutrons is polyethylene, the metal piece is a lead piece and the neutron detector is a helium 3 ($^3$He) gas meter. However, according to other embodiments of the invention:
the material able to thermalize neutrons may be paraffin or water or graphite, etc.,
the metal may be a metal other than lead, and
the neutron detector may be a meter other than a helium 3 ($^3$He) gas counter such, for example, a boron deposition gas meter.

The polyethylene piece 1 has a hollow cylinder shape deprived of a wall fraction. The lead piece 2 comprises a solid part 2a inserted in the space which corresponds to the deprived wall fraction of the polyethylene piece 1 and a recessed part 2b which extends away from the solid part and which is accommodated within the wall of the polyethylene piece 1, in contact with the polyethylene piece. A gamma radiation source 4 is accommodated in an indentation of the recessed part of the lead piece 2. At least one neutron detector (eleven detectors are represented in FIG. 1B) is placed in the bulk of the polyethylene piece 1.

The function of the lead piece 2 is to limit the dose rate at the neutron detectors. The lead piece has a thickness chosen therefor. For helium 3 gas meters, for example, the dose rate limit is about 0.1 mGγ/h gamma. The lead piece 2 also enables the operators to be protected against the irradiation of gamma radiation source. For this protection, shields and/or an exclusion zone for prohibiting the approach of the device could also be contemplated. The advantage of the lead piece 2 is also to limit, if necessary, the background photoneutron production rate in other elements than beryllium such as, for example, deuterium which is present in polyethylene.

The gamma radiation source 4 is a point or linear source. When the source is a point one, the device of the invention preferentially comprises means able to ensure movement thereof along the axis of the cylinder. When the source is linear, it is attached to the lead piece, for example using a stainless steel tube placed in a notch of the lead piece. Preferentially, the linear source is longer (for example twice longer) than the height of the investigated object. According to a particular embodiment of the invention, the device of the invention also comprises means able to rotate the investigated object about the axis of the hollow cylinder.

Thanks to the presence of a movable gamma radiation point source or a gamma radiation linear source and, in the abovementioned particular embodiment, means able to rotate the investigated object, the device according to the invention enables the irradiation of the object to be homogenized, thus minimizing the uncertainty which exists regarding the distribution of beryllium in the object.

When several detectors 3 are used, as is represented in the figures, they are preferentially evenly distributed, on a same circumference, in the polyethylene piece 1 about the object 5.

The gamma radiation source is preferentially a $^{124}$Sb source. Advantageously, the $^{124}$Sb source has a main radiation of 1691 keV which promotes the following nuclear reaction:

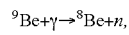
$^9Be+\gamma \rightarrow {}^8Be+n$,

The trigger threshold of this reaction is located at 1666 keV, without the excitation of other elements likely to exist in the investigated object, which have a threshold much higher than this energy level. The photoneutrons emitted in this nuclear reaction thus have an energy in the order of 25 keV (1691 keV-1666 keV).

The neutron detector(s) 3 count(s) the neutrons n which result from this nuclear reaction. In a known manner per se, counting the neutrons enables the amount of beryllium present in the object to be determined, via a calibration multiplying coefficient measured or calculated by numerical simulation.

The device of the invention advantageously enables the detection of photoneutrons to be favoured over the detection of neutrons spontaneously emitted by the object measured. This enables the signal to noise ratio and thus the statistical accuracy on the background noise free signal to be very substantially improved.

Neutrons which participate in the neutron background noise result either from a spontaneous fission with an average energy of the neutrons emitted in the order of 2 MeV, or from a reaction ($\alpha$,n) with an average energy of the neutrons emitted higher than one MeV, for example 4.2 MeV for the reaction $^9$Be($\alpha$,n) in the presence of intensive alpha emitters as $^{238}$Pu, $^{241}$Am, etc.

The best signal to noise ratio performances are obtained by the judicious choice of the position of the neutron detectors in the thickness of the polyethylene piece.

Figure 2:
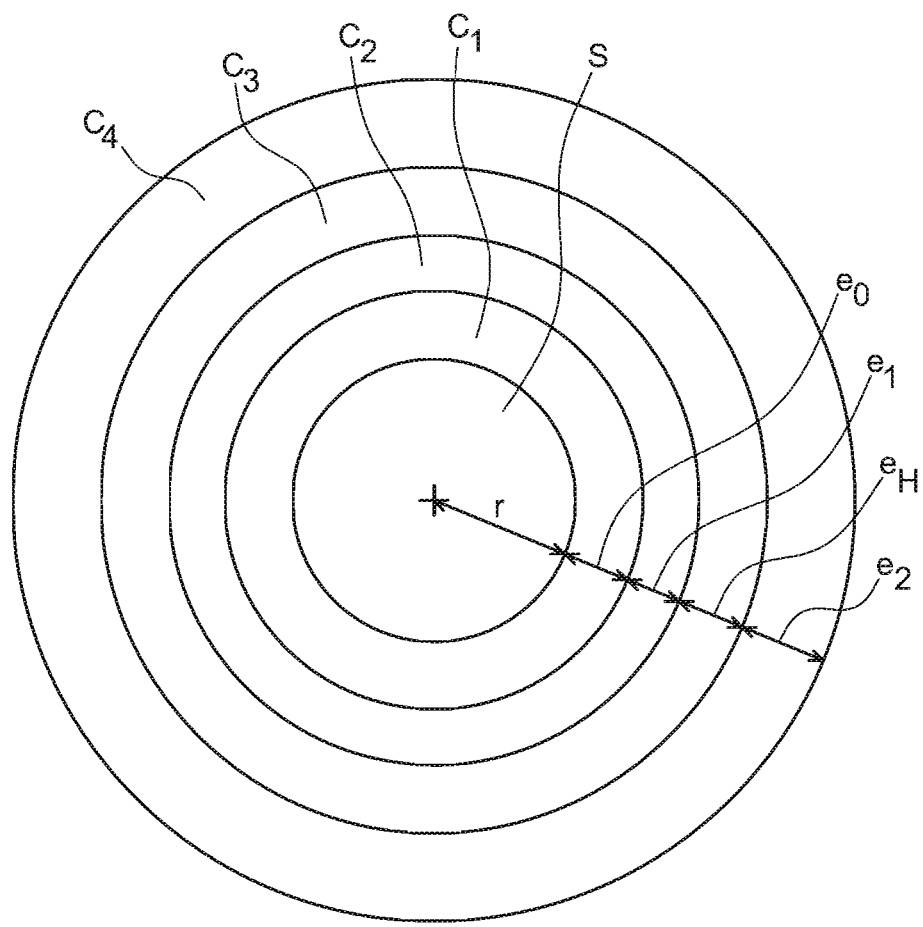
FIG. 2 represents a cross-section view of a simplified structure used for modelling the main constituent elements of the device according to the invention.

FIG. 2 represents a cross-section view of a simplified structure used for modelling the main constituent elements of the device of the invention.

The structure chosen for modelling is a sphere of metal powder S with a radius r surrounded by a succession of spherical layers, namely: a lead layer $C_1$ with a thickness $e_0$, a first polyethylene layer $C_2$ with a thickness $e_1$, a helium 3 gas layer $C_3$ with a thickness $e_H$ and a second polyethylene layer $C_4$ with a thickness $e_2$. Advantageously, the structure represented in FIG. 2 makes it possible to optimize the thicknesses of polyethylene layers which are placed, in the device of the invention, in front of and behind the helium 3 gas meters. The radius r of the sphere S is equal to 4.3 cm and the thickness $e_H$ of the helium 3 gas layer is equal to 2.54 cm. As already mentioned previously, the lead layer $C_1$ has a thickness $e_0$ chosen to limit the dose rate at the detectors, for example 1 cm. It is considered that the neutrons are homogeneously emitted in the sphere of metal powder. Two energy spectrums are used for modelling, that is neutrons of 25 keV representative of the photoneutrons from the reactions ($\gamma$, n) on beryllium and a spectrum which corresponds to neutrons of spontaneous fission of $^{240}$Pu which make up a significant passive background noise source.

Table 1 herein below gives values for the detection efficiency of neutrons emitted by the reaction ($\gamma$, n) on beryllium as a function of the thicknesses $e_1$ and $e_2$. As is known to those skilled in the art, the neutron detection efficiency having a given energy spectrum is, by definition, the ratio of the number of detected counts to the number of emitted neutrons which have the energy spectrum.

TABLE 1

| $e_2\backslash e_1$ (cm) | 0 | 1 | 2 | 3 | 4 | 5 |
|---|---|---|---|---|---|---|
| 2 | 0.1585 | 0.3019 | 0.4400 | 0.5017 | 0.4959 | 0.4482 |
| 4 | 0.2894 | 0.4141 | 0.5215 | 0.5566 | 0.5316 | 0.4717 |
| 6 | 0.3322 | 0.4480 | 0.5449 | 0.5720 | 0.5412 | 0.4776 |
| 8 | 0.3447 | 0.4571 | 0.5515 | 0.5762 | 0.5436 | 0.4792 |
| 10 | 0.3484 | 0.4599 | 0.5531 | 0.5773 | 0.5443 | 0.4796 |
| 12 | 0.3492 | 0.4606 | 0.5533 | 0.5774 | 0.5445 | 0.4797 |
| 14 | 0.3495 | 0.4607 | 0.5535 | 0.5774 | 0.5445 | 0.4797 |
| 16 | 0.3497 | 0.4607 | 0.5536 | 0.5774 | 0.5445 | 0.4797 |
| 18 | 0.3496 | 0.4608 | 0.5536 | 0.5774 | 0.5445 | 0.4797 |
| 20 | 0.3496 | 0.4609 | 0.5536 | 0.5774 | 0.5445 | 0.4797 |
| 22 | 0.3496 | 0.4609 | 0.5536 | 0.5774 | 0.5445 | 0.4797 |

The first row of table 1 consists of different values of the thickness $e_1$ and the first column consists of different values of the thickness $e_2$. At each intersection ($e_1$, $e_2$) is associated the corresponding detection efficiency value. From table 1, it appears that, regardless of the values $e_1$ and $e_2$, the detection efficiency is higher than 15%, which is very satisfactory. It is also noted that, for a set $e_2$ value, the detection efficiency passes through a maximum when $e_1$ increases. This is due to two antagonistic effects: the slowing down (or thermalization) of neutrons in polyethylene which promotes the detection thereof by helium 3 and the absorption of the neutrons thermalized in the same polyethylene. Besides, for a fixed $e_1$ value, it is noted that the detection efficiency increases and then reaches an asymptotic value when $e_2$ increases. This is due to the fact that the polyethylene located behind helium 3 plays the role of a reflector for the lowest values of thickness $e_2$, this reflector role being no longer played beyond a certain thickness, the neutrons being then absorbed and no longer able to come back to the helium 3 meters.

Furthermore, table 2 below represents the detection efficiency of neutrons of spontaneous fission of $^{240}$Pu as a function of the thicknesses $e_1$ and $e_2$. The thickness $e_1$ is also present in the first row of the table and the thickness $e_2$ in the first column, each intersection ($e_1$, $e_2$) giving the associated detection efficiency value.

TABLE 2

| $e_2\backslash e_1$ (cm) | 0 | 1 | 2 | 3 | 4 | 5 |
|---|---|---|---|---|---|---|
| 2 | 0.0317 | 0.0764 | 0.1404 | 0.1911 | 0.2458 | 0.2720 |
| 4 | 0.0969 | 0.1549 | 0.2212 | 0.2780 | 0.3161 | 0.3336 |
| 6 | 0.1370 | 0.1965 | 0.2611 | 0.3138 | 0.3474 | 0.3609 |
| 8 | 0.1550 | 0.2142 | 0.2774 | 0.3281 | 0.3599 | 0.3716 |
| 10 | 0.1623 | 0.2211 | 0.2835 | 0.3337 | 0.3648 | 0.3756 |
| 12 | 0.1649 | 0.2236 | 0.2860 | 0.3360 | 0.3665 | 0.3769 |
| 14 | 0.1659 | 0.2246 | 0.2868 | 0.3367 | 0.3671 | 0.3774 |
| 16 | 0.1664 | 0.2248 | 0.2871 | 0.3369 | 0.3672 | 0.3775 |
| 18 | 0.1666 | 0.2252 | 0.2874 | 0.3369 | 0.3673 | 0.3775 |
| 20 | 0.1667 | 0.2252 | 0.2875 | 0.3370 | 0.3674 | 0.3777 |
| 22 | 0.1669 | 0.2252 | 0.2876 | 0.3370 | 0.3673 | 0.3776 |

It is noted that for a set thickness $e_2$, the detection efficiency increases with the thickness $e_1$, however the variation range of the thickness $e_1$ investigated (located between 0 and 5 cm) does not make it possible to observe the efficiency maximum which is observed with the photoneutrons (cf. table 1). This is due to the higher energy of the neutrons of spontaneous fission of $^{240}$Pu: the detection efficiency optimum is then obtained for a thickness $e_1$ higher than 5 cm. If the thickness $e_1$ is set, an increase and then a saturation of the detection efficiency is observed as previously (cf. table 1) when the thickness $e_2$ increases.

In view of the good detection sensitivity of the device of the invention, it is advantageously possible to partly sacrifice the detection yield of the photoneutrons only and to favour the ratio of the detection yield of the photoneutrons to the detection yield of the neutrons of spontaneous fission.

Table 3 below illustrates the ratio of detection efficiencies which are given in tables 1 and 2.

The thickness $e_1$ is present in the first row of the table and the thickness $e_2$ is present in the first column.

With each intersection ($e_1$, $e_2$) is associated a value of the ratio of detection efficiencies.

TABLE 3

| $e_2$\$e_1$ (cm) | 0 | 1 | 2 | 3 | 4 | 5 |
|---|---|---|---|---|---|---|
| 2 | 5.005 | 3.950 | 3.133 | 2.625 | 2.017 | 1.648 |
| 4 | 2.987 | 2.673 | 2.357 | 2.002 | 1.682 | 1.414 |
| 6 | 2.425 | 2.280 | 2.087 | 1.823 | 1.558 | 1.323 |
| 8 | 2.224 | 2.134 | 1.988 | 1.756 | 1.510 | 1.290 |
| 10 | 2.147 | 2.080 | 1.951 | 1.730 | 1.492 | 1.277 |
| 12 | 2.117 | 2.060 | 1.935 | 1.719 | 1.486 | 1.273 |
| 14 | 2.107 | 2.052 | 1.930 | 1.715 | 1.483 | 1.271 |
| 16 | 2.101 | 2.050 | 1.928 | 1.714 | 1.483 | 1.271 |
| 18 | 2.098 | 2.046 | 1.926 | 1.714 | 1.483 | 1.271 |
| 20 | 2.097 | 2.046 | 1.926 | 1.713 | 1.482 | 1.270 |
| 22 | 2.095 | 2.047 | 1.925 | 1.713 | 1.483 | 1.270 |

From table 3, it appears that the ratio R of the detection efficiencies takes the highest values for the lowest thicknesses $e_1$ and $e_2$. Besides, the detection efficiency of the photoneutrons also takes, in these cases (low thicknesses $e_1$ and $e_2$), the lowest values (cf. table 1). The choice of the optimum thicknesses $e_1$ and $e_2$ is thus made by a compromise between the value of the ratio R and the value of the detection efficiency of the photoneutrons.

It is also to be noted that in the absence of polyethylene (which case is not represented in tables 1-3 and for which both thicknesses $e_1$ and $e_2$ are zero), the detection efficiency would become much too low (typically lower than 1%) for a measurement of beryllium amount to be contemplatable.

By way of non-limiting example, a thickness $e_1$ equal to 1.5 cm and a thickness $e_2$ equal to 3 cm have been selected for the device presented in FIGS. 1A and 1B. For this example, the other dimensions of the device are:

Height H of the hollow cylinder: 30 cm,
Internal diameter d1 of the hollow cylinder: 10.6 cm,
Thickness of the wall of the lead recessed piece which is accommodated in contact with the polyethylene piece: 1 cm,
Length of the linear source: 25 cm (the source being centred inside the hollow cylinder),
Diameter D of a neutron detector: 2.54 cm,
Height of helium 3 gas filled neutron detector having a pressure of 4 bars: 25 cm,
Height of the investigated object: 11 cm the object being centred in the hollow cylinder).

The structure of the invention makes it possible to implement a method for measuring an amount of beryllium which is advantageously simple and minimizes the noise due to intrinsic neutron emission of the measured objects and results in reliable and accurate results.

In a known manner per se, the method for measuring the amount of beryllium implemented with the device of the invention comprises a step of measuring the intrinsic neutron noise emitted by the radioactive object. This measurement is performed in the absence of a radiation source. The intrinsic noise is then subtracted from the signal measured in the presence of the radiation source. As is known to those skilled in the art, this subtracting of the intrinsic noise introduces a statistical uncertainty on the useful signal measured. Advantageously, this uncertainty is strongly decreased by virtue of the device of the invention.

Figure 3A:
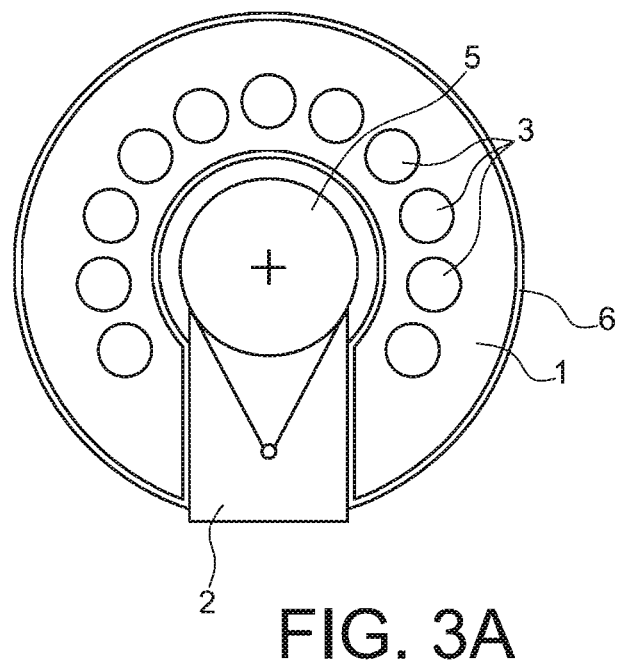
FIGS. 3A and 3B represent a top view and a longitudinal cross-section view of an improvement of the device for measuring the amount of beryllium in a radioactive object according to the invention.
Figure 3B:
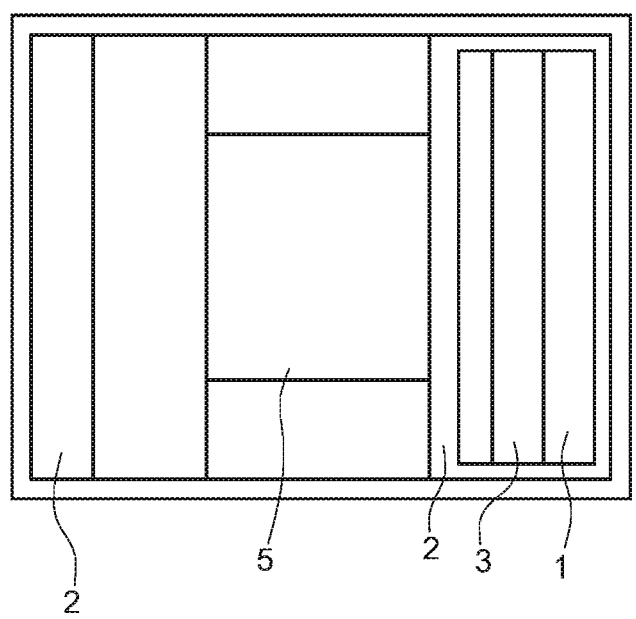

Also advantageously, in the absence of a gamma radiation source, the device of the invention enables a passive neutron counting to be made. It is also possible to measure the plutonium amount which is present in the object. A measurement of neutron coincidences is generally necessary, in this case, to discriminate, in a known manner per se, the useful signal emitted by plutonium during spontaneous fission reactions, from the background noise due to the presence of alpha emitters, due to reactions ($\alpha$, n) on light nuclei as those of beryllium or oxygen. This coincidence measurement requires, in a known manner per se, the presence of at least two neutron detectors and a processing electronics able to manage coincidences. The polyethylene quasi-cylinder 1 is then fully covered with cadmium plates 6 to limit, in a known manner per se, the life time of the neutrons in the detection device and thus promote the analysis of neutron coincidences (cf. FIGS. 3A and 3B). In spite of the optimization of the positioning of the detectors 3 in the polyethylene block 1 made for the purpose of promoting photoneutron detection to the detriment of that of neutrons spontaneously emitted by the radioactive object, the detection efficiency of the latter remains advantageously sufficient (typically higher than 20% for the device presented in FIG. 1) to allow a coincidence analysis.

The invention claimed is:

1. A device for measuring an amount of beryllium in a radioactive object, comprising:
    a hollow cylinder comprising:
        a piece made of a material for thermalizing neutrons emitted by the radioactive object, and
        a metal piece for mitigating a dose rate on the radioactive object,
    the piece of material for thermalizing neutrons having a hollow cylinder shape deprived of a wall fraction;
    the metal piece comprising:
        a solid part inserted in a space that corresponds to the deprived wall fraction of the piece made of a material for thermalizing neutrons, and
        a recessed part which extends away from the solid part and is accommodated within the wall of the piece made of a material for thermalizing neutrons, in contact with the piece made of a material for thermalizing neutrons;
    a gamma radiation source accommodated in an indentation of the recessed part of the metal piece; and
    at least one neutron detector placed in a bulk of the piece made of a material for thermalizing neutrons,
    and wherein, in a cross-section plane perpendicular to the axis of the cylinder, a distance which separates, in the piece made of a material for thermalizing neutrons, the metal piece of a neutron detector is between 0 cm and 2 cm, and
    wherein a distance which separates, in the piece made of a material for thermalizing neutrons, a neutron detector from an external surface which delimits the piece made of a material for thermalizing neutrons is between 2 cm and 4 cm.

2. The device according to claim 1, wherein the neutron detector is a helium 3 gas meter.

3. The device according to claim 1, wherein the gamma radiation source is a point source.

4. The device according to claim 3, wherein the gamma radiation source is movable along an axis substantially parallel to the axis of the hollow cylinder.

5. The device according to claim 1, wherein the gamma radiation source is a linear source attached in the indentation of the recessed part of the metal piece and having an axis substantially parallel to the axis of the hollow cylinder.

6. The device according to claim 1, wherein the device is configured to rotate the radioactive object relative to the hollow cylinder.

7. The device according to claim 1, wherein the gamma radiation source is a $^{124}$Sb source.

8. The device according to claim 1, wherein the hollow cylinder is a hollow revolution cylinder.

9. The device according to claim 8, wherein a plurality of neutron detectors are evenly distributed in the piece of material for thermalizing neutrons, at an equal distance from a center of a circle defined by the circular cross-section of the hollow revolution cylinder.

10. The device according to claim 1, wherein the material for thermalizing neutrons is polyethylene.

11. The device according to claim 1, wherein the metal piece is a lead piece.

* * * * *

UNITED STATES PATENT AND TRADEMARK OFFICE
CERTIFICATE OF CORRECTION

PATENT NO. : 9,915,738 B2
APPLICATION NO. : 15/113370
DATED : March 13, 2018
INVENTOR(S) : Cedric Carasco et al.

Page 1 of 1

It is certified that error appears in the above-identified patent and that said Letters Patent is hereby corrected as shown below:

On the Title Page

Item (73), the Assignee's Name is incorrect. Item (73) should read:
-- (73) Assignee: COMMISSARIAT A L'ENERGIE ATOMIQUE ET AUX ENERGIES ALTERNATIVES, Paris (FR) --

Signed and Sealed this
Eleventh Day of December, 2018

Andrei Iancu
*Director of the United States Patent and Trademark Office*